United States Patent
Chen et al.

(10) Patent No.: US 11,822,900 B2
(45) Date of Patent: Nov. 21, 2023

(54) FILTER PROCESSING DEVICE AND METHOD OF PERFORMING CONVOLUTION OPERATION AT FILTER PROCESSING DEVICE

(71) Applicant: CANON KABUSHIKI KAISHA, Tokyo (JP)

(72) Inventors: Tsewei Chen, Tokyo (JP); Masami Kato, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 582 days.

(21) Appl. No.: 16/896,565

(22) Filed: Jun. 9, 2020

(65) Prior Publication Data
US 2020/0394516 A1 Dec. 17, 2020

(30) Foreign Application Priority Data

Jun. 17, 2019 (JP) .................................. 2019-112129

(51) Int. Cl.
| | |
|---|---|
| G06F 7/544 | (2006.01) |
| G06N 3/02 | (2006.01) |
| G06N 3/08 | (2023.01) |
| G06F 17/15 | (2006.01) |
| G06F 18/2431 | (2023.01) |
| G06V 10/764 | (2022.01) |
| G06V 10/82 | (2022.01) |
| G06V 10/44 | (2022.01) |

(52) U.S. Cl.
CPC ........ *G06F 7/5443* (2013.01); *G06F 18/2431* (2023.01); *G06N 3/08* (2013.01); *G06V 10/454* (2022.01); *G06V 10/764* (2022.01); *G06V 10/82* (2022.01)

(58) Field of Classification Search
USPC .............. 382/156, 279, 260; 706/15, 22, 25
See application file for complete search history.

(56) References Cited

U.S. PATENT DOCUMENTS

| | | | |
|---|---|---|---|
| 5,508,823 A | 4/1996 | Kiyohara et al. | ............. 358/463 |
| 7,881,524 B2 | 2/2011 | Matsugu et al. | ............. 382/156 |
| 8,472,721 B2 | 6/2013 | Ito et al. | ...................... 382/181 |

(Continued)

FOREIGN PATENT DOCUMENTS

| | | |
|---|---|---|
| JP | 2018-032190 A | 3/2018 |
| JP | 2018-067154 | 4/2018 |

OTHER PUBLICATIONS

Y. Wei, et al., "Revisiting Dilated Convolution: A Simple Approach for Weakly- and Semi-Supervised Semantic Segmentation", IEEE/CVF Conference on Computer Vision and Pattern Recognition, Jun. 2018.

(Continued)

*Primary Examiner* — Ishrat I Sherali
(74) *Attorney, Agent, or Firm* — Venable LLP

(57) ABSTRACT

There is provided with a filter processing device for performing a convolution operation using a filter on a feature plane. An acquisition unit acquires feature plane data, filter coefficients of the filter, and valid coefficient information which specifies filter coefficients to be used in the convolution operation among the filter coefficients of the filter. A calculation unit performs a convolution operation of the filter coefficients specified by the valid coefficient information and pieces of the feature plane data corresponding to the specified filter coefficients.

20 Claims, 9 Drawing Sheets

(56) References Cited

U.S. PATENT DOCUMENTS

| | | | |
|---|---|---|---|
| 8,515,180 B2 | 8/2013 | Kato et al. | 382/195 |
| 8,594,432 B2 | 11/2013 | Yamamoto et al. | 382/190 |
| 8,615,135 B2 | 12/2013 | Kato et al. | 382/201 |
| 8,655,057 B2 | 2/2014 | Kato et al. | 382/159 |
| 9,014,483 B2 | 4/2015 | Ito et al. | 382/205 |
| 9,021,347 B2 | 4/2015 | Ito et al. | 715/211 |
| 9,053,388 B2 | 6/2015 | Ito et al. | G06K 9/00248 |
| 9,135,553 B2* | 9/2015 | Kato | G06N 3/063 |
| 9,659,227 B2 | 5/2017 | Nakashima et al. | G06K 9/4642 |
| 10,938,999 B2* | 3/2021 | Yamamoto | H04N 1/0289 |
| 11,514,290 B2* | 11/2022 | Son | G06N 3/04 |
| 11,580,354 B2* | 2/2023 | Cho | G06N 3/063 |
| 2014/0337262 A1* | 11/2014 | Kato | G06F 17/15 706/26 |
| 2017/0116495 A1* | 4/2017 | Nomura | G06V 10/955 |
| 2019/0205780 A1* | 7/2019 | Sakaguchi | G06N 3/0454 |
| 2021/0042616 A1* | 2/2021 | Furukawa | G06F 7/523 |
| 2021/0200455 A1* | 7/2021 | Takahashi | G06F 3/0659 |
| 2022/0076097 A1* | 3/2022 | Zhao | G06N 3/04 |

OTHER PUBLICATIONS

Japanese Office Action dated Jun. 9, 2023 in counterpart Japanese Patent Appln. No. 2019-112129.

Hiroki Nakahara et al., A CNN-based Classifier for a Digital Spectrometer on a Radio Telescope, IEICE Technical Report [Online], Japan, The Institute of Electronics, Information and Communication Engineers, May 2, 2019, vol. 119 No. 18, pp. 103-108.

* cited by examiner

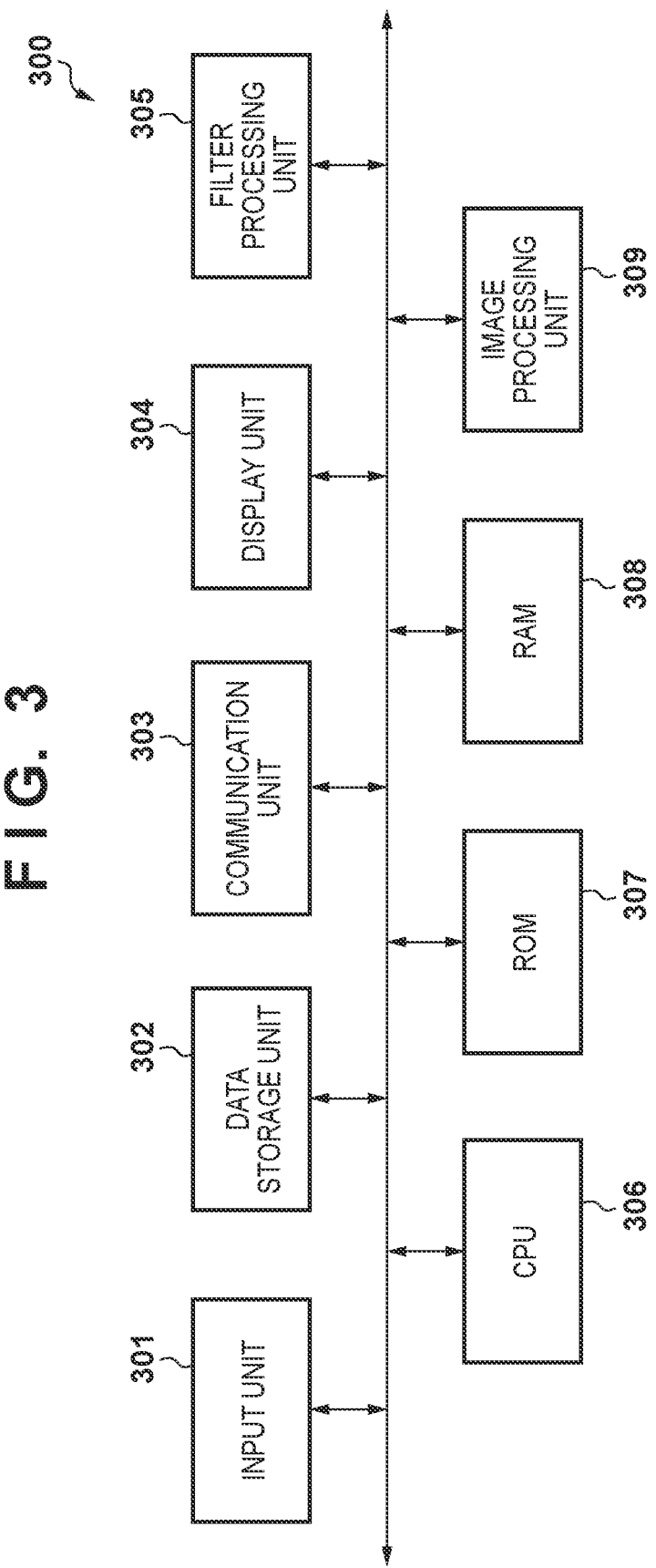

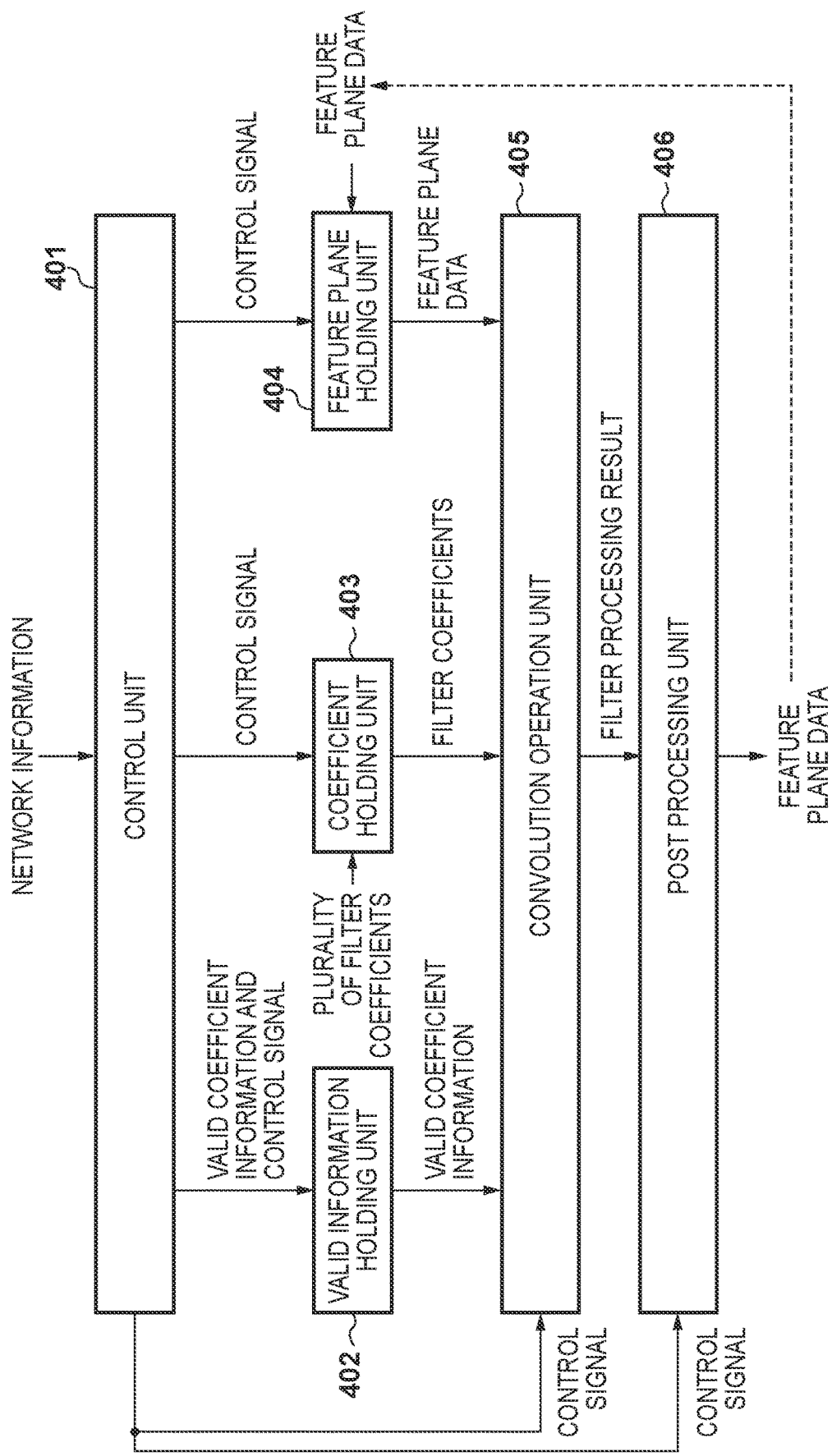

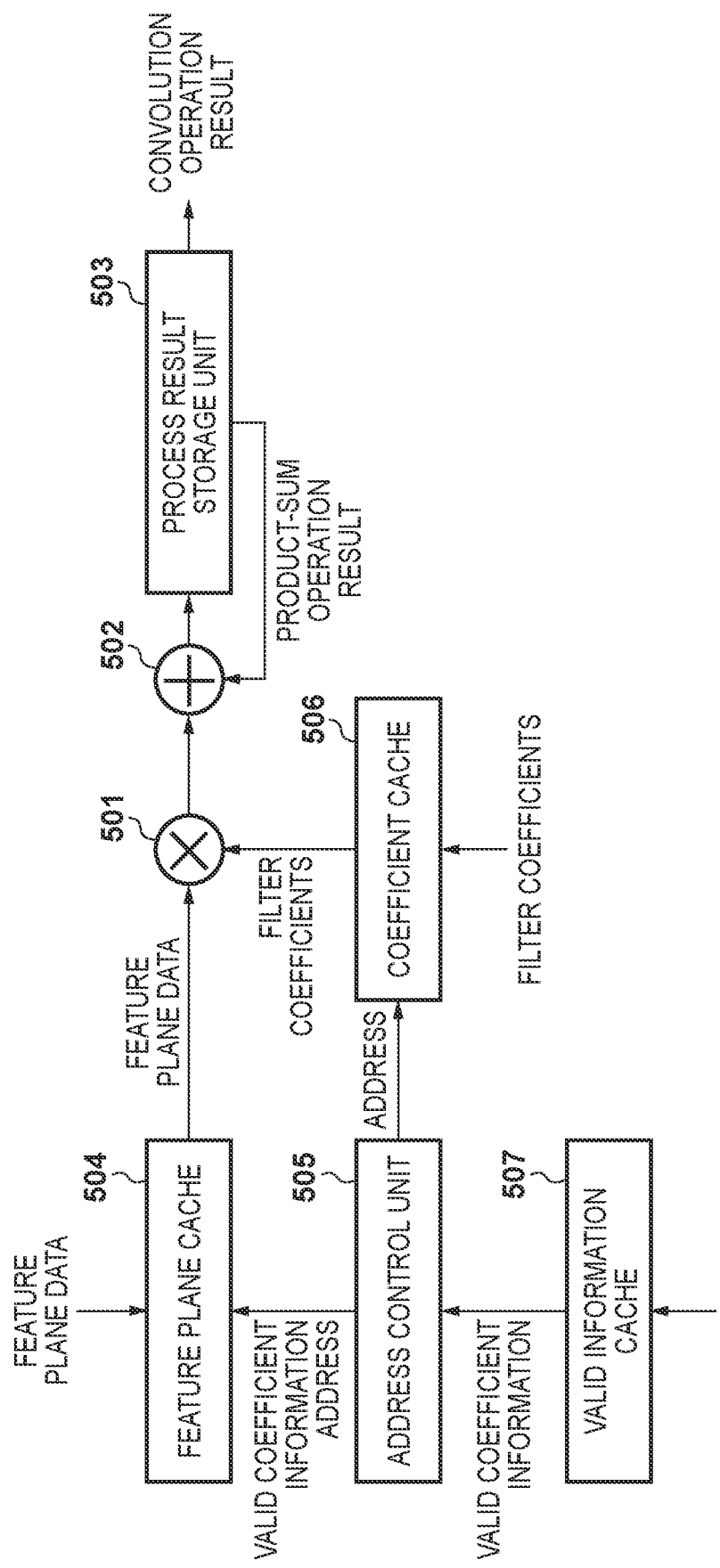

FIG. 6A

| 5 | 2 | 6 | | 5 | 15 | 7 | | 6 | 4 | 7 | | 5 | 6 | 5 |
|---|---|---|---|---|----|---|---|---|---|---|---|---|---|---|
| 1 | 3 | 4 | | 4 | 6  | 7 | | 4 | 7 | 1 | | 9 | 9 | 1 |
| 5 | 9 | 7 | | 10| 8  | 2 | | 10| 5 | 2 | | 6 | 8 | 4 |

| 1 | 1 | 1 |
|---|---|---|
| 1 | 1 | 1 |
| 1 | 1 | 1 |

| 0 | 3 | 0 | | 0 | 2 | 0 | | 0 | 1 | 0 | | 0 | 6 | 0 |
|---|---|---|---|---|---|---|---|---|---|---|---|---|---|---|
| 4 | 0 | 5 | | 0 | 4 | 5 | | 1 | 4 | 1 | | 2 | 3 | 8 |
| 0 | 2 | 0 | | 0 | 5 | 0 | | 0 | 4 | 0 | | 0 | 1 | 0 |

| 0 | 1 | 0 |
|---|---|---|
| 1 | 1 | 1 |
| 0 | 1 | 0 |

| 0 | 0 | 0 | | 0 | 0 | 0 | | 0 | 0 | 0 | | 0 | 0 | 0 |
|---|---|---|---|---|---|---|---|---|---|---|---|---|---|---|
| 6 | 7 | 9 | | 9 | 5 | 6 | | 4 | 1 | 4 | | 3 | 2 | 4 |
| 10| 8 | 2 | | 1 | 4 | 6 | | 3 | 9 | 4 | | 1 | 9 | 2 |

| 0 | 0 | 0 |
|---|---|---|
| 1 | 1 | 1 |
| 1 | 1 | 1 |

| TIME | 0ns | 1ns | 10ns | 19ns | 28ns | 37ns |
|---|---|---|---|---|---|---|
| TRANSFER OF VALID COEFFICIENT INFORMATION | $E_{x,y}(1)$ | | | | | |
| PRODUCT-SUM OPERATION RESULT | | | | | | $O_{i,j}(1)$ |
| FEATURE PLANE | | $I_{i+x,j+y}(1)$ | $I_{i+x,j+y}(2)$ | $I_{i+x,j+y}(3)$ | $I_{i+x,j+y}(4)$ | |
| FILTER COEFFICIENTS | | $C_{x,y}(1,1)$ | $C_{x,y}(2,1)$ | $C_{x,y}(3,1)$ | $C_{x,y}(4,1)$ | |

| 1ns | 2ns | 3ns | 4ns | 5ns | 6ns | 7ns | 8ns | 9ns |
|---|---|---|---|---|---|---|---|---|
| $C_{0,0}(1,1)$ | $C_{1,0}(1,1)$ | $C_{2,0}(1,1)$ | $C_{0,1}(1,1)$ | $C_{1,1}(1,1)$ | $C_{2,1}(1,1)$ | $C_{0,2}(1,1)$ | $C_{1,2}(1,1)$ | $C_{2,2}(1,1)$ |

FIG. 7B

| TIME | 0ns | 1ns | 6ns | 11ns | 16ns | 21ns |
|---|---|---|---|---|---|---|
| TRANSFER OF VALID COEFFICIENT INFORMATION | $E_{x,y}(1)$ | | | | | |
| PRODUCT-SUM OPERATION RESULT | | | | | | $O_{i,j}(1)$ |
| FEATURE IMAGE | | $I_{i+x,j+y}(1)$ | $I_{i+x,j+y}(2)$ | $I_{i+x,j+y}(3)$ | $I_{i+x,j+y}(4)$ | |
| FILTER COEFFICIENTS | | $C_{x,y}(1,1)$ | $C_{x,y}(2,1)$ | $C_{x,y}(3,1)$ | $C_{x,y}(4,1)$ | |

| 1ns | 2ns | 3ns | 4ns | 5ns |
|---|---|---|---|---|
| $C_{1,0}(1,1)$ | $C_{0,1}(1,1)$ | $C_{1,1}(1,1)$ | $C_{2,1}(1,1)$ | $C_{1,2}(1,1)$ |

FIG. 7C
| TIME | 0ns | 1ns | 7ns | 13ns | 19ns | 25ns |
|---|---|---|---|---|---|---|
| TRANSFER OF VALID COEFFICIENT INFORMATION | $E_{x,y}(1)$ | | | | | |
| PRODUCT-SUM OPERATION RESULT | | | | | | $O_{i,j}(1)$ |
| FEATURE IMAGE | | $I_{i+x,j+y}(1)$ | $I_{i+x,j+y}(2)$ | $I_{i+x,j+y}(3)$ | $I_{i+x,j+y}(4)$ | |
| FILTER COEFFICIENTS | | $C_{x,y}(1,1)$ | $C_{x,y}(2,1)$ | $C_{x,y}(3,1)$ | $C_{x,y}(4,1)$ | |
| 1ns | 2ns | 3ns | 4ns | 5ns | 6ns |
|---|---|---|---|---|---|
| 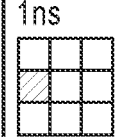 | 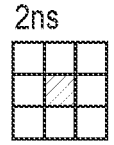 | 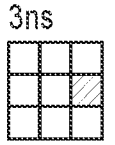 | 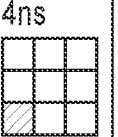 | 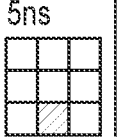 | 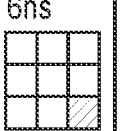 |
| $C_{0,1}(1,1)$ | $C_{1,1}(1,1)$ | $C_{2,1}(1,1)$ | $C_{0,2}(1,1)$ | $C_{1,2}(1,1)$ | $C_{2,2}(1,1)$ |

FILTER PROCESSING DEVICE AND METHOD OF PERFORMING CONVOLUTION OPERATION AT FILTER PROCESSING DEVICE

BACKGROUND OF THE INVENTION

Field of the Invention

The present invention relates to a filter processing device and a method of performing a convolution operation at a filter processing device, in particular, processing using a neural network such as processing to recognize a specific pattern from target data, for example.

Description of the Related Art

Processing using a neural network are being applied in an increasingly broad range of fields. For example, the accuracy of image recognition increases as deep learning advances, and a convolutional neural network (CNN) is commonly used for the deep learning.

Calculation processing using a neural network such as a CNN includes filter processing, and a convolution operation to be performed in the filter processing includes a large number of product-sum operations. In order to use such a neural network in an embedded system such as a mobile terminal or an on-vehicle device, filter processing is required to be performed at high speed. For example, Japanese Patent Laid-Open No. 2018-67154 discloses that performing convolution operations in parallel by using common filter coefficients for a plurality of pieces of feature plane data causes processing to be speeded up.

On the other hand, application techniques of neural networks have also advanced. For example, Wei (Y. Wei, et al., at "Revisiting Dilated Convolution: A Simple Approach for Weakly- and Semi-Supervised Semantic Segmentation", IEEE/CVF Conference on Computer Vision and Pattern Recognition, 2018.) proposes that a dilated convolution operation scheme is used in connection with image recognition techniques.

SUMMARY OF THE INVENTION

According to an embodiment of the present invention, a filter processing device for performing a convolution operation using a filter on a feature plane comprises: an acquisition unit configured to acquire feature plane data, filter coefficients of the filter, and valid coefficient information which specifies filter coefficients to be used in the convolution operation among the filter coefficients of the filter; and a calculation unit configured to perform a convolution operation of the filter coefficients specified by the valid coefficient information and pieces of the feature plane data corresponding to the specified filter coefficients.

According to another embodiment of the present invention, a method of performing, at a filter processing device, a convolution operation using a filter on a feature plane comprises: acquiring feature plane data, filter coefficients of the filter, and valid coefficient information which specifies filter coefficients to be used in the convolution operation among the filter coefficients of the filter; and performing a convolution operation of the filter coefficients specified by the valid coefficient information and pieces of the feature plane data corresponding to the specified filter coefficients.

Further features of the present invention will become apparent from the following description of exemplary embodiments (with reference to the attached drawings).

BRIEF DESCRIPTION OF THE DRAWINGS

FIG. 3 is a block diagram illustrating a configuration example of a filter processing device according to one embodiment.

FIG. 4 is a block diagram illustrating a configuration example of a filter processing unit 305.

FIG. 5 is a block diagram illustrating a configuration example of a convolution calculator 405.

FIGS. 6A to 6F illustrate filter coefficients and valid coefficient information to be used in one embodiment.

FIGS. 7A to 7C illustrate progress of filter processing in one embodiment.

DESCRIPTION OF THE EMBODIMENTS

Figure 1:
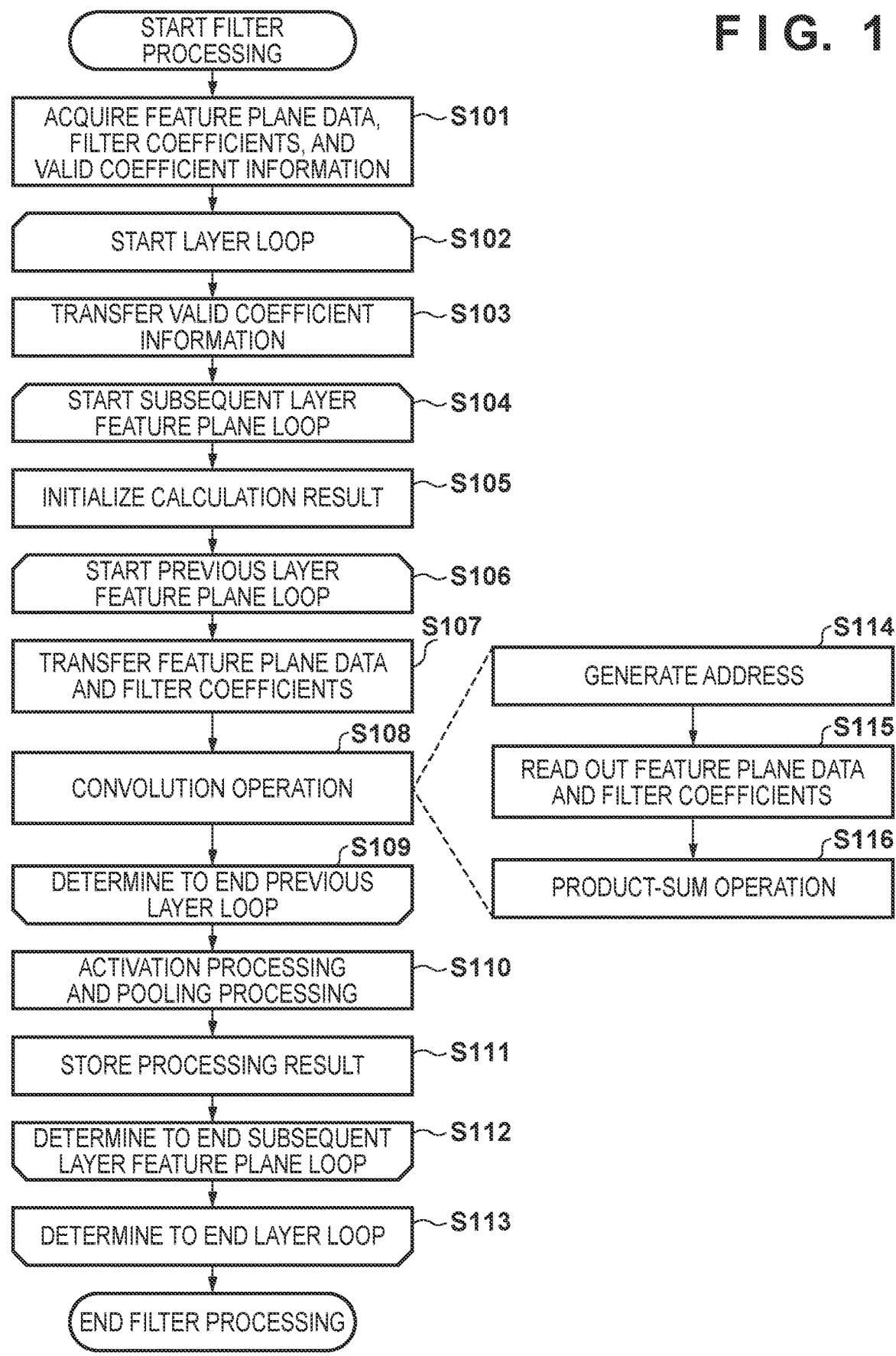
FIG. 1 is a flowchart of filter processing in one embodiment.

There is a need for further increasing a speed of processing using a neural network. One embodiment of the present invention can increase the speed of filter processing.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(Configuration Example of Filter Processing Device)

FIG. 3 is a block diagram illustrating an example of a hardware configuration of a filter processing device according to the one embodiment of the present invention.

As described in detail later, the filter processing unit 305 performs filter processing using a filter on a feature plane. The filter processing unit 305 can perform operations using a neural network by performing respective pieces of processing including such filter processing. A filter processing device 300 illustrated in FIG. 3 uses such a filter processing unit 305 to perform operations using the neural network on an image. For example, the filter processing unit 305 can perform processing according to the flowchart of FIG. 1 on an image processed by an image processing unit 309 and stored in a RAM 308 to output the processing result to a data storage unit 302 or the RAM 308. However, such a filter processing unit 305 may be used in applications other than image processing, and in other words, a configuration other than the filter processing unit 305 illustrated in FIG. 3 is not essential to the present invention. Note that the filter processing unit 305 can perform the filter processing on a static image or a moving image. The filter processing unit 305 can perform the filter processing on each of a plurality of frames included in the moving image, for example.

An input unit 301 is a device configured to accept an instruction or data from a user. The input unit 301 may be, for example, a keyboard, a pointing device, a button, or the like.

The data storage unit 302 can store data such as image data. The data storage unit 302 may be, for example, a hard disk, a flexible disk, a CD-ROM, a CD-R, a DVD, a memory card, a CF card, a smart media, an SD card, a memory stick, an xD picture card, a USB memory, or the like. The data storage unit 302 may store a program or other data. Note that a part of the RAM 308 to be described below may be used as the data storage unit 302.

A communication unit 303 is an interface (I/F) for performing communication between devices. The filter processing device 300 can exchange data with other devices via the communication unit 303. Note that the filter processing device 300 may use a storage device connected via the communication unit 303 as a virtual data storage unit, that is, as the data storage unit 302.

A display unit 304 is a device configured to display information to a user or the like. The display unit 304 can display images before or after image processing or can display other images such as a GUI, for example. The display unit 304 may be a CRT or a liquid crystal display, for example. The display unit 304 may be a device being outside of the filter processing device 300 and connected with a cable or the like. Note that the input unit 301 and the display unit 304 may be an identical device, and the input unit 301 and the display unit 304 may be a touch screen device, for example. In this case, an input on the touch screen corresponds to an input to the input unit 301.

A CPU 306 controls overall operations of the filter processing device 300. Additionally, the CPU 306 can perform various kinds of processing such as image processing or image recognition processing based on processing results generated by the filter processing unit 305 and stored in the data storage unit 302 or the RAM 308. The CPU 306 can store these processing results in the RAM 308.

A ROM 307 and the RAM 308 provide the CPU 306 with a program, data, a work area, and the like necessary for processing by the CPU 306. The program necessary for processing by the CPU 306 may be stored in the data storage unit 302 or the ROM 307 and may be loaded into the RAM 308 from the data storage unit 302 or the ROM 307. Additionally, a filter processing device 300 may receive the program via the communication unit 303. In this case, the program may be loaded into the RAM 308 once the program has been recorded in the data storage unit 302 or may be directly loaded from the communication unit 303 into the RAM 308. In any case, the CPU 306 may execute the program loaded into the RAM 308.

The image processing unit 309 can perform image processing on image data. For example, the image processing unit 309 can read out image data written in the data storage unit 302 in accordance with an instruction from the CPU 306, perform range adjustment of pixel values, and write the processing result into the RAM 308.

The filter processing device 300 illustrated in FIG. 3 has the respective units described above in the inside. The above-described units are connected such that data can be transmitted to and received from each other. However, the respective units including, for example, the input unit 301, the data storage unit 302, and the display unit 304 may be connected with each other in a communication path in accordance with a known communication method. That is, the filter processing device according to the one embodiment may be configured with a plurality of devices physically separated from each other.

In addition, the filter processing device 300 illustrated in FIG. 3 includes one CPU 306, but may also include a plurality of CPUs. Furthermore, at least a part of functions of the respect units (for example, the filter processing unit 305 and the image processing unit 309) included in the filter processing device 300 may be enabled by the CPU 306 operating according to the program.

The filter processing device 300 may have various constituent elements not illustrated in FIG. 3, but the description thereof is omitted.

(Structural Example of Neural Network)

As described above, the filter processing unit 305 can perform filter processing using a filter on a feature plane. In addition, the filter processing unit 305 can perform operations according to a neural network including a plurality of layers, and can perform such filter processing in at least one layer. The filter processing includes a convolution operation, and the convolution operation includes a product-sum operation. An example of a neural network to be used by the filter processing unit 305 will be described below.

The CNN, which is a type of a neural network, has a structure in which a plurality of layers are connected hierarchically. Each layer may include a plurality of feature planes (feature images). In the following, a feature plane obtained by performing corresponding processing on a feature plane of a previous layer is referred to as a feature plane (feature image) of a subsequent layer. Note that a case in which a feature plane having two dimensions will be described below, but the feature plane may have one dimension or may be a high-order feature plane that has equal to or more than three dimensions.

For example, the feature plane of the subsequent layer may be calculated by using the filter processing to the feature plane of the previous layer. In this filter processing, a filter configured with filter coefficients corresponding to the previous layer can be used. Each of a plurality of feature planes of the subsequent layer can be generated by the filter processing using a corresponding filter. A plurality of feature planes of the previous layer may also be used in order to calculate one feature plane of the subsequent layer. For example, on each of the plurality of feature planes of the previous layer, the filter processing using the corresponding filter can be performed to obtain one feature plane of the subsequent layer based on a plurality of obtained processing results.

For example, a feature plane ($O_{i,j}(n)$) after the filter processing can be calculated according to Equation (1) by using a feature plane of the previous layer ($I_{i,j}(m)$) and filter coefficients ($C_{0,0}(m, n)$ to $C_{X-1, Y-1}(m, n)$). Here, i and j indicate coordinates of a feature plane. Also, x and y indicate coordinates of a filter. n is a number of a feature plane of the subsequent layer. Moreover, m is a number of a feature plane of the previous layer, and the number of feature planes of the previous layer is M. The filter coefficients are different for each feature plane of the previous layer and each feature plane of the subsequent layer, and the number of the filter coefficients is X×Y for a combination of one feature plane.

[Equation 1]

$$O_{i,j}(n) = \sum_{m=1}^{M} \sum_{x=0}^{X-1} \sum_{y=0}^{Y-1} (I_{i+x, j+y}(m) \times C_{x,y}(m, n)) \tag{1}$$

As described above, the number of times of product-sum operations to be performed in the filter processing for calculating one feature plane of the subsequent layer is M×X×Y times. In this way, the filter has a plurality of filter coefficients, and a pixel value of each pixel of a feature plane after the filter processing is obtained by a convolution operation of pixel values of a group of pixels around a corresponding pixel of a feature plane of the previous layer and the filter coefficients that the filter has.

A feature plane of the subsequent layer can be calculated by further performing processing such as an activation process or a pooling process on the feature plane $O_{i,j}(n)$ obtained by such filter processing.

Figure 2:
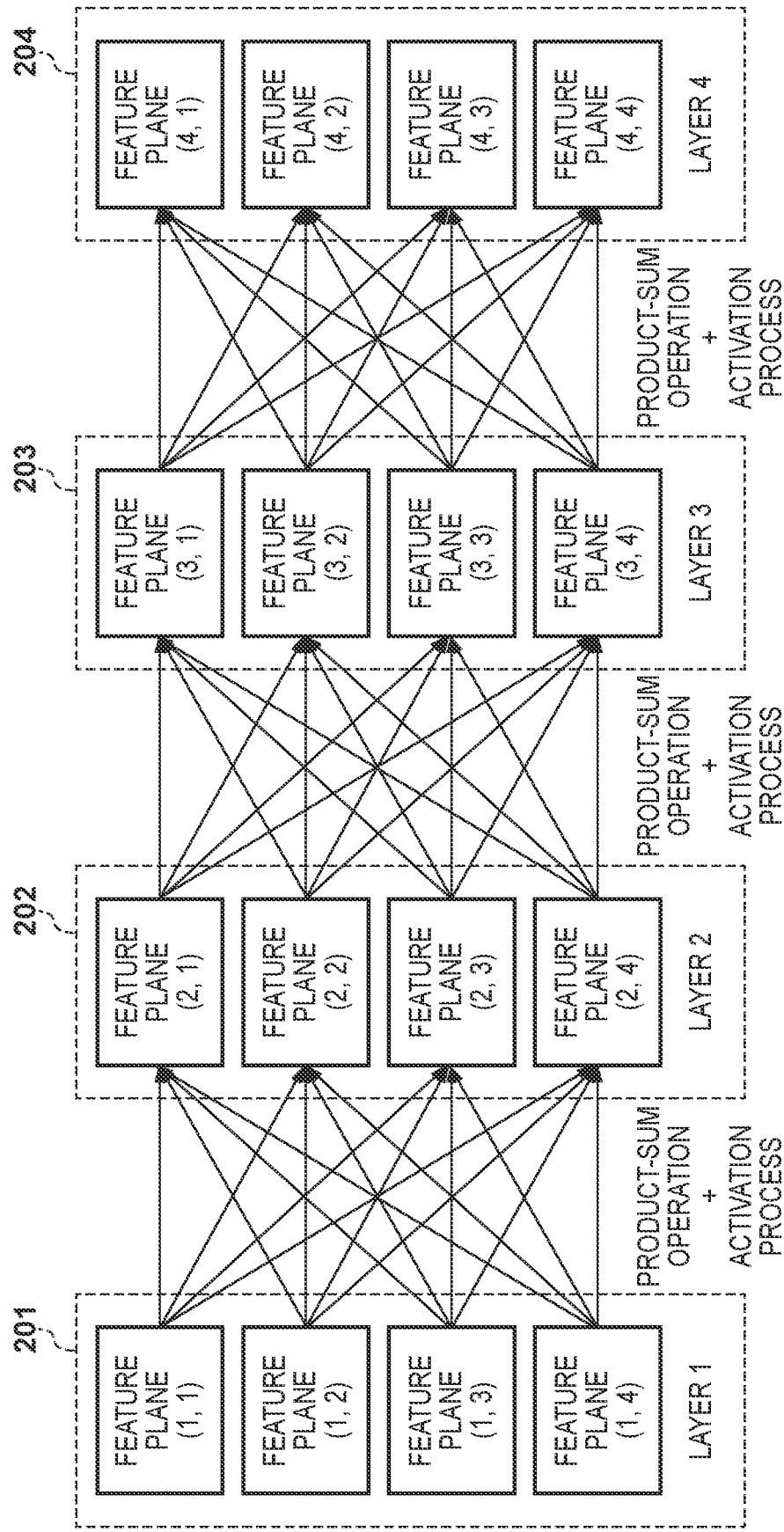
FIG. 2 is a diagram illustrating a structural example of a neural network to be used in one embodiment.

FIG. 2 illustrates a specific structural example of a neural network. In the neural network illustrated in FIG. 2, the number of layers is four, and four feature planes are included in each layer. The feature planes of each layer can be obtained based on filter processing results obtained by applying a filter defined for each feature plane to pixel information of the feature plane (feature plane data). Here, filter coefficients of the filter have been previously obtained according to a known learning technique. Moreover, filter processing in which the filter is applied is product-sum operations, which include a plurality of multiplications and cumulative additions. In FIG. 2, arrows indicate product-sum operations.

FIGS. 6A, 6C, and 6E illustrate examples of filters to be used to calculate several feature planes. A Filter 601 is filters to be used to calculate a feature plane (2,1). A pixel value for each pixel of the feature plane (2,1) is obtained by applying respective four filters included in the filter 601 to corresponding pixels of a feature plane (1, 1), a feature plane (1, 2), a feature plane (1, 3), and a feature plane (1, 4) and multiplying the obtained values. Similarly, filters 603 and 605 are filters to be used to calculate a feature plane (3, 1) and a feature plane (4, 1), respectively.

In other words, the filter processing unit 305 calculates the feature plane (2, 1) by performing product-sum operations using a plurality of feature planes 201 and the filter coefficients of the filter 601. Similarly, the filter processing unit 305 generates a plurality of feature planes 202 in a layer 2 through product-sum operations using the plurality of feature planes 201 and filter coefficients (not illustrated). Furthermore, the filter processing unit 305 generates a plurality of feature planes 203 in a layer 3 through product-sum operations using the plurality of feature planes 202 and filter coefficients. Then, the filter processing unit 305 generates a plurality of feature planes 204 in a layer 4 through product-sum operations using a plurality of feature planes 203 and filter coefficients.

Here, as with filters 603 and 605, some filter coefficients may be 0. In the dilated convolution operation scheme described in Wei, some filter coefficients of a filter to be used in filter processing are 0. Also, during learning, learning (training) may be performed such that some filter coefficients are 0.

In the present embodiment, in addition to feature planes and filter coefficients, information specifying the filter coefficients to be used in a convolution operation among the filter coefficients is used in the filter processing. In the following, the information specifying the filter coefficients to be used in the convolution operation is referred to as valid coefficient information. In addition, the filter coefficient to be used in the convolution operation is referred to as a valid coefficient, and a position of the valid coefficient in the filter is referred to as a valid position. The valid coefficient information may specify whether or not to use the filter coefficient in the convolution operation for each position of the filter. The valid coefficient information may be associated with each filter. For example, a plurality of filters having the same filter size (for example, 3×3) may be associated with different valid coefficient information, respectively.

For example, a pixel value after the filter processing in a target pixel is obtained by product-sum operations of valid coefficients from a reference point of the filter to a predetermined relative position (valid position) and pixel values of pixels from the target pixel to the same predetermined relative position. The valid position also corresponds to relative arrangement of the pixels to be subjected to the product-sum operations from the target pixel, in a filter operation that calculates the pixel value after the filter processing in the target pixel. In the one embodiment, the valid coefficient refers to a filter coefficient that is not 0, and the valid coefficient information is information indicating a position where the filter coefficient is not 0 in terms of the filter. Note that the valid coefficient information and the filter coefficient information may be integrated. For example, information indicating filter coefficients for respective positions of the filter may represent both the filter coefficients and the valid coefficient information that the filter has. That is, the information may indicate that the filter coefficients are 0 for some positions of the filter, and in this case, it can be specified that the filter coefficients that are not 0 are filter coefficients that are used in the convolution operation.

In such an embodiment, a product-sum operation using an invalid coefficient can be omitted in the product-sum operations by which the pixel value after the filter processing in the target pixel is determined. In the one embodiment, the invalid coefficient refers to a filter coefficient that is not a valid coefficient, for example, a filter coefficient that is 0.

FIGS. 6B, 6D, and 6F illustrate pieces of valid coefficient information 602, 604, and 606 corresponding to filters 601, 603, and 605, respectively. In the example of FIG. 6B, the valid coefficient information 602 is common for filters (four 3×3 filters included in the filter 601) that are applied to the respective feature planes (1, 1) to (1, 4) of a layer 1. In other words, the valid coefficient information 602 is common for filters to be used to calculate the feature plane (2, 1) of a layer 2. In this way, valid coefficient information may be common for at least two filters. According to the valid coefficient information 602, the filters have nine valid coefficients, and in other words, all filter coefficients are valid.

Thus, in the one embodiment, the filter processing is performed for each of a plurality of feature planes (for example, the feature planes (1, 1) to (1, 4)) of the previous layer, by using corresponding filters (for example, the four 3×3 filters included in the filter 601). Then, based on this filter processing, feature planes (for example, the feature plane (2, 1)) of the subsequent layer are calculated. At this time, the valid coefficient information 602 may be common for filters to be applied to the plurality of respective feature planes (for example, the feature planes (1, 1) to (1, 4)) of the previous layer. That is, the filter processing device 300 may calculate the plurality of respective feature planes of the layer 2 (a second layer) by the filter processing, to the feature planes of the layer 1 (a first layer), using the filters corresponding to the plurality of respective feature planes of the layer 1 (the first layer). Here, for the filters corresponding to the plurality of respective feature planes of the layer 1, the valid coefficient information may be common. On the other hand, the valid coefficient information 602 may be different for each of the filters to be applied to the plurality of feature planes of the previous layer.

Also, in the one embodiment, the filter processing is performed on feature planes (for example, the feature plane (1, 1)) of the previous layer. Then, based on this filter processing, a plurality of feature planes (for example, feature planes (2, 1) to (2, 4)) of the subsequent layer are calculated. In this filter processing, filters corresponding to the feature planes to be calculated of the subsequent layer are used. At this time, the valid coefficient information 602 may be common for the filters to be applied to calculate the plurality of respective feature planes (for example, the feature planes (2, 1) to (2, 4)) of the subsequent layer. On the other hand, the valid coefficient information 602 may be different for each of the filters to be applied to calculate the plurality of respective feature planes of the subsequent layer.

As described above, filters having filter coefficients ($C_{0, 0}(m, n)$ to $C_{X-1, Y-1}(m, n)$) can be used in order to calculate the feature planes of the subsequent layer from the feature planes of the previous layer. In this case, for the filters to be applied to calculate the feature planes of the subsequent layer from the feature planes of the previous layer, the valid coefficient information 602 may be the same regardless of a combination of $(m, n)$.

The valid coefficient information 604 is also common for filters to be applied to the respective feature planes (2, 1) to (2, 4) of the layer 2. According to the valid coefficient information 604, the filters have five valid coefficients, and four filter coefficients at four corners are invalid. Similarly, according to the valid coefficient information 606, filters have six valid coefficients, and three filter coefficients in a first row are invalid. In this way, the valid coefficient information may be different for each layer. For example, for filters to be used to calculate feature planes in at least two layers among a plurality of layers, the valid coefficient information may be different. That is, the filter processing device 300 may calculate a plurality of respective feature planes of the layer 4 (a fourth layer) by filter processing, on feature planes of the layer 3 (a third layer), using filters corresponding to a plurality of respective feature planes of the layer 3 (the third layer). Here, for the filters corresponding to the plurality of respective feature planes of the layer 3, the valid coefficient information may be common. On the other hand, the valid coefficient information may be different between the filters corresponding to the plurality of respective feature planes of the layer 1 and the filters corresponding to the plurality of respective feature planes of the layer 3.

Hereinafter, description will be given of a case where a product-sum operation can be omitted by using the valid coefficient information. The valid coefficient information of the filters is defined as $E_{x, y}(n)$. When a filter coefficient of coordinates $(x, y)$ is valid, a value of $E_{x, y}(n)$ is 1. Also, when the filter coefficient of the coordinates $(x, y)$ is not valid, the value of $E_{x, y}(n)$ is 0. In this example, the filters to be used to calculate the same feature plane of the subsequent layer (filters having a common value of n) share the same valid coefficient information $E_{x, y}(n)$. In this case, the feature plane ($O_{i, j}(n)$) after the filter processing may be obtained according to Equation (2) obtained by adding the valid coefficient information to Equation (1). When the valid coefficient information defined as above is used, Equation (2) gives the same value as Equation (1).

[Equation 2]

$$O_{i,j}(n) = \sum_{m=1}^{M} \sum_{x=0}^{X-1} \sum_{y=0}^{Y-1} (I_{i+x, j+y}(m) \times E_{x,y}(n) \times C_{x,y}(m, n)) \quad (2)$$

Here, for a combination $(x, y)$ of $E_{x, y}(n)$ whose value is 0, a value of $I_{i+x, j+y}(m) \times E_{x, y}(n) \times C_{x, y}(m, n)$ is 0. Therefore, even when the product-sum operation is omitted for the combination $(x, y)$ of $E_{x, y}(n)$ whose value is 0, the feature plane ($O_{i, j}(n)$) that can be obtained does not change. Thus, in the present embodiment, the product-sum operation using the invalid coefficient can be omitted.

Note that when the value of $E_{x, y}(n)$ is 1, a value of the filter coefficient $C_{x, y}(m, n)$ is arbitrary. On the other hand, when the value of $E_{x, y}(n)$ is 0, the filter coefficient may be set or learning (training) of the filter coefficient may be performed such that the value of the filter coefficient $C_{x, y}(m, n)$ becomes 0.

Information indicating the structure of the neural network to be used in the processing may be provided in the filter processing unit 305 or may be stored in the data storage unit 302, the RAM 308 or the like. The information indicating the structure of the neural network (hereinafter, referred to as network information) can include, for example, an calculation amount of the product-sum operations, a size of the feature planes, the number of feature planes, the valid coefficient information of the filters, and the like for each layer.

Note that in the examples illustrated in FIGS. 6A to 6F, a filter size (a height and a width of the filters) is 3×3. However, the filter size is not limited and any filter size can be used. The valid coefficient information can represent valid positions for a filter having any filter size.

Thus, in the present embodiment, by using the valid coefficient information in the filter processing, a product-sum operation that does not affect a filter processing result can be omitted. As a result, the processing efficiency of the filter processing can be improved.

(Configuration and Processing of Filter Processing Unit)

FIG. 4 illustrates an example of a functional configuration of the filter processing unit 305. The filter processing unit 305 includes a convolution calculator 405 configured to perform filter processing using filters on feature planes. For example, the convolution calculator 405 can determine a filter processing result from filter coefficients and feature plane data according to the above-described Equation (2).

The filter processing unit 305 may further include a valid information holding unit 402, a coefficient holding unit 403, and a feature plane holding unit 404. The valid information holding unit 402 can acquire and hold the valid coefficient information $E_{x, y}(n)$ to provide the valid coefficient information $E_{x, y}(n)$ to the convolution calculator 405. The coefficient holding unit 403 can acquire and hold the filter coefficient $C_{x, y}(m, n)$ to provide the filter coefficient $C_{x, y}(m, n)$ to the convolution calculator 405. Moreover, the feature plane holding unit 404 can acquire and hold a feature plane $I(m)$ and provide the feature plane $I(m)$ to the convolution calculator 405.

The filter processing unit 305 may further include a post processing unit 406. The post processing unit 406 can perform a further process such as an activation process or a pooling process on a result of the filter processing obtained by the convolution calculator 405. Note that, instead of the post processing unit 406, another processing unit such as the CPU 306 may perform such a further process, for example.

The filter processing unit 305 may further include a control unit 401. The control unit 401 can control the operations of the above-described respective units. The control unit 401 may include a control circuit such as a CPU or a sequencer, for example.

FIG. 5 illustrates an example of a configuration of the convolution calculator 405. The convolution calculator 405 includes an acquisition unit configured to acquire feature plane data, filter coefficients included in filters, and valid coefficient information that is associated with the filters and that specifies the filter coefficients to be used in a convolution operation. In FIG. 5, the acquisition unit is configured with a feature plane cache 504, a coefficient cache 506, and a valid information cache 507. The feature plane cache 504 acquires feature plane data. The feature plane cache 504 can temporarily hold feature plane data acquired from the feature plane holding unit 404 to buffer a part of feature plane data stored in the feature plane holding unit 404. The coefficient cache 506 acquires filter coefficients specified by valid coefficient information. The coefficient cache 506 can temporarily hold filter coefficients acquired from the coefficient holding unit 403 to buffer some of filter coefficients stored in the coefficient holding unit 403. The valid information cache 507 acquires valid coefficient information. The valid information cache 507 can temporarily hold valid coefficient information acquired from the valid information holding unit 402.

Moreover, the convolution calculator 405 includes a calculator configured to perform a convolution operation of the filter coefficients specified by the valid coefficient information and feature plane data corresponding to the filter coefficients. In FIG. 5, this calculator is configured with a multiplier 501, an adder 502, and a processing result storage unit 503. The multiplier 501 calculates a product of feature plane data of one pixel provided from the feature plane cache 504 and one filter coefficient provided from the coefficient cache 506 and transfers the calculated product to the adder 502. The adder 502 accumulates products transferred from the multiplier 501, thereby generating a result of product-sum operations (convolution operation result) of the feature plane data and the filter coefficients. The adder 502 can generate a result of product-sum operations by repeating addition of a product transferred from the multiplier 501 and a value held in the processing result storage unit 503 and storing of the obtained value in the processing result storage unit 503. Thus, a plurality of results of the product-sum operations stored in the processing result storage unit 503 (filter processing result) are output as a result of a convolution operation.

The convolution operation unit 405 may include an address control unit 505. The address control unit 505 can acquire valid coefficient information from the valid information cache 507. Then, the address control unit 505 can control transfer of feature plane data from the feature plane cache 504 to the multiplier 501 according to the valid coefficient information. Additionally, the address control unit 505 can also control transfer of filter coefficients from the coefficient cache 506 to the multiplier 501.

As described above, a part of the convolution operation of a filter coefficient (for example, an invalid coefficient) that is not specified by the valid coefficient information among filter coefficients that a filter has, and a piece of feature plane data corresponding to the filter coefficient that is not specified by the valid coefficient information can be omitted. That is, the filter processing unit 305 (for example, the multiplier 501) may omit such a part of the convolution operation. For example, according to control of the address control unit 505, the feature plane cache 504 can transfer a piece of feature plane data corresponding to a filter coefficient specified by the valid coefficient information to the multiplier 501. On the other hand, according to the control of the address control unit 505, the feature plane cache 504 can omit the transfer of the piece of feature plane data corresponding to the filter coefficient that is not specified by the valid coefficient information to the multiplier 501. Similarly, according to the control of the address control unit 505, the coefficient cache 506 can omit transfer of a filter coefficient that is not specified by the valid coefficient information to the multiplier 501 while transferring the filter coefficients specified by the valid coefficient information to the multiplier 501.

FIG. 1 is an example of a flowchart of processing to be performed by the filter processing unit 305. According to the flowchart illustrated in FIG. 1, as illustrated in FIGS. 6A to 6F, filter processing can be efficiently performed in a case where common valid coefficient information is used for one layer. Control processing illustrated in steps S101 to S116 can be performed by the control unit 401 (for example, a CPU or a sequencer provided in the control unit 401).

In step S101, the control unit 401 reads out feature plane data of an input layer, filter coefficients to be used in filter processing, and valid coefficient information from the RAM 308, and stores them in the feature plane holding unit 404, the coefficient holding unit 403, and the valid information holding unit 402. In the example of FIG. 2, the feature plane data of the input layer is an input image to the neural network, and feature planes 201 are calculated from the input image.

In step S102, a loop for each layer starts. In step S102, the control unit 401 can select layers in order from a layer of which feature planes are first calculated. The layer selected in step S102 is referred to as a subsequent layer. Additionally, as described above, feature planes of the subsequent layer are calculated by using feature planes of a previous layer. In the example of FIG. 2, the control unit 401 can first select the layer 2, and in this case, the previous layer is the layer 1. In the example of FIG. 2, the layer 2 is the layer of which the feature planes are first calculated.

In step S103, the control unit 401 reads out valid coefficient information corresponding to the subsequent layer from the valid information holding unit 402, and stores the valid coefficient information in the valid information cache 507. The control unit 401 can read out the valid coefficient information with reference to network information.

In step S104, a loop starts for each feature plane of the subsequent layer. In step S104, the control unit 401 can select the feature planes of the subsequent layer in order from the beginning.

In step S105, the control unit 401 initializes a convolution calculation result held in the processing result storage unit 503. For example, the control unit 401 can set the convolution operation result to zero.

In step S106, a loop of an image for each feature plane of the previous layer starts. In step S106, the control unit 401 can select the feature planes of the previous layer in order from the beginning.

In step S107, the control unit 401 transfers data of the feature plane selected in step S106 to the feature plane cache 504. The control unit 401 can transfer pieces of feature plane data corresponding to the filter coefficients specified by the valid coefficient information. On the other hand, the control unit 401 may transfer a piece of feature plane data corresponding to a filter coefficient that is not specified by the valid coefficient information. Moreover, the control unit 401 also transfers filter coefficients of a filter corresponding to the feature plane selected in step S106 to the coefficient cache 506. The control unit 401 can transfer filter coefficients specified by the valid coefficient information. On the other hand, the control unit 401 may transfer a filter coefficient that is not specified by the valid coefficient information.

In step S108, the convolution calculation unit 405 performs a convolution operation in accordance with a control signal from the control unit 401. The convolution computation unit 405 can perform a convolution operation based on feature plane data, filter coefficients, and valid coefficient information respectively stored in the feature plane cache 504, the coefficient cache 506, and the valid information cache 507. Details of this processing will be described later.

In step S109, the control unit 401 determines an end of the loop for each feature plane of the previous layer. In a case where all feature planes in the previous layer have been selected in step S106, the processing proceeds to step S110. In this case, a filter processing result for the feature plane, selected in S104, of the subsequent layer is stored in the processing result storage unit 503. In a case where not all feature planes in the previous layer have been selected in step S106, the processing returns to step S107, and the control unit 401 selects the next feature plane of the previous layer.

In step S110, the post processing unit 406 performs post processing on the filter processing result obtained in the loops of steps S106 to S109 in accordance with a control signal from the control unit 401. The post processing unit 406 can perform the post processing selected according to the network information. For example, the post processing unit 406 can perform an activation process on the filter processing result. As an example, the post processing unit 406 can obtain a result of the activation process using a Rectified Linear Unit (ReLU) according to Equation (3).

[Equation 3]

$$f(x) = \begin{cases} 0, & x < 0 \\ x, & X \geq 0 \end{cases} \quad (3)$$

In Equation (3), f(x) is an activation function, and x is input data. However, a type of the activation function is not limited to the ReLU, and other non-linear functions or quantization functions may be used. Furthermore, the post processing unit 406 may further perform a pooling process on the result of the activation process. According to the pooling process, a size of the feature plane of the subsequent layer can be adjusted. Note that one or both of the activation process and the pooling process may be omitted.

In step S111, the control unit 401 stores the processing result from the post processing unit 406 in the feature plane holding unit 404. In this manner, the processing result stored in the feature plane holding unit 404 is feature plane data of the subsequent layer, and can be used for calculating feature plane data of a further layer.

In step S112, the control unit 401 determines an end of the loop for each feature plane of the subsequent layer. In a case where all feature planes in the subsequent layer have been selected in step S104, the processing proceeds to step S113. Otherwise, the processing returns to step S104, and the control unit 401 selects the next feature plane of the subsequent layer.

In step S113, the control unit 401 determines an end of the loop for each layer. In a case where all layers have been selected in step S102, the processing of FIG. 1 ends. At this time, the feature plane holding unit 404 stores an output from the neural network to which the input image has been input. In a case where not all layers have been selected in step S102, the processing returns to step S102, and the control unit 401 selects the subsequent layer.

Next, convolution operation processing to be performed in step S108 will be described in more detail. Step S108 includes steps S114 to S116. Note that one feature plane includes a plurality of pixels, and processes in steps S114 to S116 are repeated for each pixel of the feature plane, selected in S104, of the subsequent layer. Hereinafter, the pixel whose pixel value is calculated in steps S114 to S116, of the feature plane of the subsequent layer is referred to as a pixel to be processed.

In step S114, the address control unit 505 generates address information based on the valid coefficient information held in the valid information cache 507. The address information indicates addresses (storage positions) in the feature plane cache 504 for the feature plane data of the previous layer to be used in product-sum operations for calculating the pixel value of the pixel to be processed. In addition, the address information indicates addresses in the coefficient cache 506 for the filter coefficients to be used in the product-sum operations for calculating the pixel value of the pixel to be processed.

Here, the address control unit 505 can generate the address information that indicates only an address for a valid filter coefficient and an address for a piece of the feature plane data corresponding to the valid filter coefficient. In other words, the address control unit 505 can omit generation of the address information that indicates an address for the invalid filter coefficient and an address for a piece of the feature plane data corresponding to the invalid filter coefficient.

In step S115, the multiplier 501 reads out the feature plane data according to the address information generated by the address control unit 505, from the feature plane cache 504. Additionally, the multiplier 501 reads out the filter coefficients according to the address information generated by the address control unit 505, from the coefficient cache 506.

In step S116, the multiplier 501 calculates a product of the read filter coefficient and feature plane data and transfers the obtained product to the adder 502. As described above, the adder 502 calculates a cumulative result (product-sum result) of a product of feature plane data and a filter coefficient, and holds the result in the processing result storage unit 503.

In the embodiment illustrated in FIGS. 4 and 5, each of the feature plane data, the filter coefficients, and the valid coefficient information is stored in two memories (the holding unit and the cache). For example, the feature plane data of the previous layer to be used for filter processing is held in the feature plane cache 504, and the feature plane data of the subsequent layer obtained as a result of the filter processing is held in the feature plane holding unit 404. According to such a configuration, reading out of the feature plane data of the previous layer (step S108) and writing of the feature plane data of the subsequent layer (step S111) can be performed in parallel, and thus the processing efficiency is improved. Also, the valid coefficient information and the filter coefficients are held in the valid information cache 507 and the coefficient cache 506, respectively. Thus, during the convolution operation processing (step S108), the filter coefficients and the valid coefficient information to be used to calculate the feature planes of another layer (or another neural network) can be acquired (step S101), so that the processing efficiency is improved.

Furthermore, in this embodiment, the filter coefficients can be transferred (step S107) a plurality of times after the valid coefficient information common for respective filters is transferred (step S103). That is, a convolution operation using filter coefficients of a first filter specified by first valid coefficient information can be performed, and a convolution operation using filter coefficients of a second filter specified by the first valid coefficient information can be successively performed. In this case, a plurality of transfer times of the valid coefficient information can be omitted, so that the overall data transfer time can be shortened.

(Processing Example According to Present Embodiment)

According to the present embodiment, by using the valid coefficient information in the filter processing, the processing efficiency of the filter processing can be improved. An effect of shortening the processing time according to the present embodiment will be described with reference to FIGS. 7A to 7C in a case where the filter coefficients illustrated in FIGS. 6A to 6F are used.

FIG. 7A is a time chart of the filter processing for obtaining the feature plane (2,1). Here, a clock period of the filter processing device 300 is 1 ns. The four 3×3 filters included in the filter 601 to be used to calculate the feature plane of the layer 2 have nine valid coefficients, that is, all filter coefficients are valid. Since the value of the valid filter coefficient is not 0, the product-sum operation cannot be omitted.

As illustrated in FIG. 7A, at 0 ns, the processing of step S103 is performed and the valid coefficient information of layer 2 is transferred. From 1 ns to 9 ns, feature plane data $I_{i+x, +y}(1)$ and filter coefficients $C_{x, y}(1, 1)$ of the previous layer are transferred, product-sum operations are performed, and a result of the product-sum operations is stored. It takes 1 ns to perform calculation using one valid coefficient and one piece of feature plane data, and since there are nine valid coefficients, the required time is 9 ns. In order to obtain a product-sum operation result $O_{i, j}(1)$, the filter processing needs to be performed on the feature plane data of the four feature planes of the previous layer. Therefore, in order to obtain the product-sum operation result $O_{i, j}(1)$, a processing time of 36 ns is required to transfer the filter coefficients four times and to repeat the aforementioned product-sum operations four times.

FIG. 7B is a time chart of the filter processing for obtaining the feature plane (3, 1). The four 3×3 filters included in the filter 603 to be used to calculate feature planes of the layer 3 have five valid coefficients. Since the value of the invalid filter coefficient is 0, the product-sum operation can be omitted.

As illustrated in FIG. 7B, at 0 ns, valid coefficient information for the layer 3 is transferred. From 1 ns to 5 ns, five pieces of feature plane data of the feature plane (2, 1) and five valid coefficients of the previous layer are transferred, product-sum operations are performed, and the required time is 5 ns. Similarly to the layer 2, in order to obtain the product-sum operation result $O_{i, j}(1)$, a processing time of 20 ns is required to repeat the above-mentioned processing four times. Since calculations for the invalid filter coefficients are omitted, the processing time is reduced by 16 ns as compared to feature plane (2, 1).

FIG. 7C is a time chart of the filter processing for obtaining the feature plane (4, 1). The four 3×3 filters included in the filter 605 to be used to calculate feature planes of the layer 4 have six valid coefficients. As illustrated in FIG. 7C, at 0 ns, valid coefficient information for the layer 4 is transferred. From 1 ns to 6 ns, six pieces of feature plane data of the feature plane (3, 1) and six valid coefficients of the previous layer are transferred, product-sum operations are performed, and the required time is 6 ns. Similarly to the layer 2, in order to obtain the product-sum operation result $O_{i, j}(1)$, a processing time of 24 ns is required to repeat the above-mentioned processing four times. Since calculations for the invalid filter coefficients are omitted, the processing time is reduced by 12 ns as compared to feature plane (2, 1).

(Modification)

In the examples of FIGS. 6A to 6F, the valid coefficient information is common for filter processing performed to calculate feature planes of the same layer. However, as discussed above, the valid coefficient information may be different for each of filters to be applied to a plurality of feature planes of the previous layer. In addition, the valid coefficient information may be different for each of filters to be applied to calculate a plurality of feature planes of the subsequent layer. In this case as well, by using the valid coefficient information, the product-sum operation for the invalid filter coefficient can be omitted, so that the processing efficiency of the filter processing is improved.

For example, when the valid coefficient information is different for each feature plane of the subsequent layer, the valid coefficient information may be expressed as $E_{x, y}(m, n)$. In this case, a filter operation can be performed according to Equation (4). According to such a configuration, a degree of freedom of setting the valid coefficient information $E_{x, y}(m, n)$ is increased, so that the recognition accuracy may be improved.

[Equation 4]

$$O_{i,j}(n) = \sum_{m=1}^{M} \sum_{x=0}^{X-1} \sum_{y=0}^{Y-1} (I_{i+x,j+y}(m) \times E_{x,y}(m, n) \times C_{x,y}(m, n)) \quad (4)$$

Moreover, the filter processing device may use a plurality of filters, and the plurality of filters may be classified into a plurality of groups. Here, valid coefficient information may be common for filters belonging to one group. In addition, for filters belonging to another group, the valid coefficient information may be different. For example, filters to be used to calculate a plurality of feature planes of a subsequent layer may be classified into a plurality of groups. Furthermore, the plurality of feature planes of the subsequent layer may be classified into a plurality of groups, or a group of filters to be used to calculate feature planes belonging to one group may be classified into one group. In such a case, the valid information cache 507 can acquire valid coefficient information associated with a group to which a filter to be used belongs.

In the examples of FIGS. 4 and 5, only the filter coefficients according to the valid coefficient information (and address information) are transferred to the multiplier 501, among the filter coefficients transferred from the coefficient holding unit 403 and stored in the coefficient cache 506. However, only the filter coefficients according to the valid coefficient information may be transferred to the coefficient cache 506. For example, the control unit 401 may transfer the filter coefficients selected according to the valid coefficient information to the coefficient cache 506 via the coefficient holding unit 403 or without interposing the coefficient holding unit 403. Similarly, only the feature plane data according to the valid coefficient information may be transferred to the feature plane cache 504. According to such a configuration, a data transfer amount from the coefficient holding unit 403 or the feature plane holding unit 404 to the convolution operation unit 405 can be reduced.

Figure 8A:
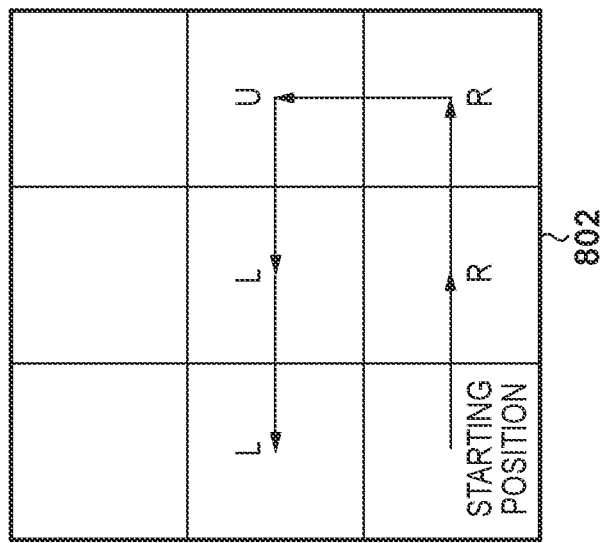
FIGS. 8A to 8B illustrate valid coefficient information to be used in one embodiment.
Figure 8B:
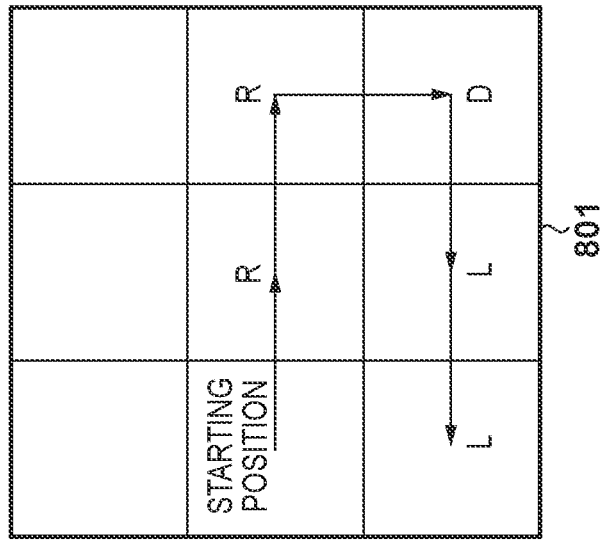

The configuration of the valid coefficient information is not limited to those illustrated in FIGS. 6A to 6F. For example, as illustrated in FIGS. 8A to 8B, the valid coefficient information may be information indicating a starting position and a scanning direction. Here, the starting position indicates a position of one filter coefficient in a filter to be used for the convolution operation. Also, the scanning direction indicates a relative position of another filter coefficient to be used in the convolution operation with respect to the one filter coefficient. In this case, a position specified by the scanning direction from the starting position can be treated as a valid position within the filter. In the examples of FIGS. 8A to 8B, a scanning pattern 801 and a scanning pattern 802 correspond to the valid coefficient information. For example, the scanning pattern 801 is represented by a starting position and a data row (R, R, D, L, L) indicating next valid positions. In FIGS. 8A to 8B, U, D, L, and R respectively mean that the next valid position is on an upper side, a lower side, a left side, and a right side. Such valid coefficient information can also specify whether the filter coefficient is used in the convolution operation for each position of the filter. In this case, in step S114, the address control unit 505 may sequentially output the address information in accordance with the scanning pattern. In addition, in step S114, the address control unit 505 may generate such a scanning pattern based on the valid coefficient information 606.

Although the CNN is illustrated in FIG. 2, the neural network that can be processed by the filter processing device 300 is not limited to the CNN. For example, the neural network may be other types of networks having layered structures such as an RNN or an MLP (multilayer perceptron). In a case of the MLP, a processing unit of feature plane data becomes one pixel, and a filter size becomes 1×1, but a part of calculation processing can be omitted in accordance with valid coefficient information as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-112129, filed Jun. 17, 2019, which is hereby incorporated by reference herein in its entirety.

What is claimed is:

1. A filter processing device for performing a convolution operation using a filter on a feature plane, the filter processing device comprising:
   one or more processors; and
   one or more instruction memories coupled to the one or more processors, the one or more instruction memories having stored thereon instructions which, when executed by the one or more processors, cause the device to:
   acquire feature plane data, filter coefficients of the filter, and coefficient validity information which specifies whether each of the filter coefficients of the filter is valid or invalid; and
   perform a convolution operation of the filter coefficients specified as valid by the coefficient validity information and pieces of the feature plane data corresponding to the filter coefficients specified as valid, without performing the convolution operation of the filter coefficients specified as invalid by the coefficient validity information and pieces of the feature plane data corresponding to the filter coefficients specified as invalid.

2. The filter processing device according to claim 1, wherein
   the instructions, when executed by the one or more processors, further cause the device to perform transfer of a piece of the feature plane data corresponding to a filter coefficient specified as valid by the coefficient validity information to a calculator, and to omit transfer of a piece of the feature plane data corresponding to the filter coefficient that is specified as invalid by the coefficient validity information to the calculator.

3. The filter processing device according to claim 1, wherein
   the instructions, when executed by the one or more processors, further cause the device to perform transfer of a filter coefficient specified as valid by the coefficient validity information to a calculator, and to omit transfer of a filter coefficient that is specified as invalid by the coefficient validity information to the calculator.

4. The filter processing device according to claim 1, wherein
   the coefficient validity information is associated with the filter.

5. The filter processing device according to claim 4, wherein
   the coefficient validity information is common for at least two filters.

6. The filter processing device according to claim 5, wherein
   the instructions, when executed by the one or more processors, further cause the device to perform a convolution operation using filter coefficients of a first filter specified as valid by a first coefficient validity information, and subsequently perform a convolution operation using filter coefficients of a second filter specified as valid by the first coefficient validity information.

7. The filter processing device according to claim 1, wherein
   a plurality of filters classified into a plurality of groups are used by the filter processing device,
   the coefficient validity information is associated with the group, and
   the instructions, when executed by the one or more processors, further cause the device to acquire the coefficient validity information associated with a group to which the filter belongs.

8. The filter processing device according to claim 1, wherein
   the instructions, when executed by the one or more processors, further cause the filter processing device to perform processing according to a neural network including a plurality of layers, and
   the instructions, when executed by the one or more processors, further cause the filter processing device to calculate each of a plurality of feature planes of a second layer by performing filter processing on a plurality of feature planes of a first layer using filters respectively corresponding to the plurality of feature planes of the first layer.

9. The filter processing device according to claim 8, wherein
   the coefficient validity information is common for the filters respectively corresponding to the plurality of feature planes of the first layer.

10. The filter processing device according to claim 9, wherein
   the instructions, when executed by the one or more processors, further cause the filter processing device to calculate each of a plurality of feature planes of a fourth layer by performing filter processing on a plurality of feature planes of a third layer using filters respectively corresponding to the plurality of feature planes of the third layer, the coefficient validity information is common for the filters respectively corresponding to the plurality of feature plane of the third layer, and the coefficient validity information is different between the filters respectively corresponding to the plurality of feature planes of the first layer and the filters respectively corresponding to the plurality of feature planes of the third layer.

11. The filter processing device according to claim 8, wherein in terms of the filters respectively corresponding to the plurality of feature planes of the first layer, the coefficient validity information for the filter is different for each feature plane.

12. The filter processing device according to claim 1, wherein the instructions, when executed by the one or more processors, further cause the device to store the filter coefficients, wherein the instructions, when executed by the one or more processors, further cause the device to buffer a part of filter coefficients stored in a coefficient memory.

13. The filter processing device according to claim 12, wherein the instructions, when executed by the one or more processors, further cause the device to buffer a filter coefficient specified as valid by the coefficient validity information, among the filter coefficients stored in the coefficient memory.

14. The filter processing device according to claim 1, wherein the instructions, when executed by the one or more processors, further cause the device to store the feature plane data in a feature plane memory, and further cause the device to buffer a part of the feature plane data stored in the feature plane memory.

15. The filter processing device according to claim 14, wherein the instructions, when executed by the one or more processors, further cause the device to buffer a piece of the feature plane data corresponding to a filter coefficient specified as valid by the coefficient validity information, among the feature plane data stored in the feature plane memory.

16. The filter processing device according to claim 1, wherein the coefficient validity information specifies, for each position of the filter, whether a filter coefficient is valid or invalid in the convolution operation.

17. The filter processing device according to claim 1, wherein the coefficient validity information includes information indicating a position of one valid filter coefficient in the filter, and information indicating a relative position of another valid filter coefficient with respect to the one filter coefficient.

18. A method of performing, at a filter processing device, a convolution operation using a filter on a feature plane, the method comprising:

acquiring feature plane data, filter coefficients of the filter, and coefficient validity information which specifies whether each of the filter coefficients of the filter is valid or invalid; and performing a convolution operation of the filter coefficients specified as valid by the coefficient validity information and pieces of the feature plane data corresponding to the filter coefficients specified as valid, without performing the convolution operation of the filter coefficients specified as invalid by the coefficient validity information and pieces of the feature plane data corresponding to the filter coefficients specified as invalid.

19. The filter processing device according to claim 1, wherein the coefficient validity information specifies a filter coefficient whose value is 0 as invalid.

20. The filter processing device according to claim 1, wherein in a case where the convolution operation is performed, the convolution operation is performed according to a neural network including a plurality of layers.

* * * * *